United States Patent [19]
Scott

[11] Patent Number: 5,199,073
[45] Date of Patent: Mar. 30, 1993

[54] KEY HASHING IN DATA PROCESSORS

[75] Inventor: Jonathan A. Scott, Chandlers Ford, United Kingdom

[73] Assignee: International Business Machines Corporation, Armonk, N.Y.

[21] Appl. No.: 773,389

[22] Filed: Oct. 8, 1991

[30] Foreign Application Priority Data

Oct. 30, 1990 [EP] European Pat. Off. ........ 90311902.2

[51] Int. Cl.$^5$ ............................................. H04F 9/00
[52] U.S. Cl. ......................................... 380/49; 380/50
[58] Field of Search ....................... 380/45, 46, 49, 50; 395/400, 600

[56] References Cited

U.S. PATENT DOCUMENTS

| | | | |
|---|---|---|---|
| 4,215,402 | 7/1980 | Mitchell et al. | 395/400 |
| 4,418,275 | 11/1983 | Oosterbaan et al. | 380/46 |
| 4,611,272 | 9/1986 | Lomet | 395/600 |
| 4,780,816 | 10/1988 | Connell | 395/400 |
| 4,922,417 | 5/1990 | Churm et al. | 395/600 |

Primary Examiner—Salvatore Cangialosi
Attorney, Agent, or Firm—Esther E. Klein

[57] ABSTRACT

A system is described for producing a near-random hash value from a key value. In a preferred embodiment the system comprises the steps of combining each key byte in turn with a corresponding byte in a predefined table; substituting each key byte with a byte from a second table, the location of the substitute byte in the table being equal to the value of the key byte; and using a propagated exclusive-OR to produce a four-byte value, which is then manipulated and scaled to produce a hash value in the desired range.

20 Claims, 4 Drawing Sheets

KEY HASHING IN DATA PROCESSORS

FIELD OF THE INVENTION

The present invention relates to data processing, and in particular to a data processing method and apparatus for generating a hash value from a character or digit string such as a file key.

BACKGROUND OF THE INVENTION

The generation of hash values is a technique used in many areas of data processing, such as database addressing and data encryption. The use of hashing techniques will now be introduced with reference to the particular example of address management in databases.

Data are commonly stored in an organized manner known as a database under control of a data processor. By means of this data processor a user is able to browse or search through the data, or to insert, amend or delete data as required. Although the user has no need to be aware of the exact manner in which the data are stored, it is important for speed of operation that the data processor is able to locate and retrieve a particular data item as accurately and quickly as possible. In practice this requires that the data processor is able to locate a desired data item directly, without having to search through the entire store of data.

In general each data item may comprise two sections: a short key identifying the item, and the remainder of the information associated with that key. For example, a particular database may use a person's name as a key to identify a larger portion of data containing further details about that person. For small data items the entire item may be used as the key. From the information in the key alone, the data processor must be able to find the physical location in the stored data in order to access the data item corresponding to that key. For example, if the data is stored on a magnetic or optical disk, the track and sector address is required before a particular data item can be accessed. In the case of hardware storage in random access memory (RAM) the storage address is required.

In order to deduce the storage location for a particular data item that item's key may be converted directly into a numerical value, which is in turn scaled or otherwise manipulated to produce a storage address lying within the possible range of addresses appropriate to the storage means in use. When the data item is originally stored, it is stored at the address calculated as above from the item's key. Again, if subsequent access to the item is required, the item is searched for at an address calculated from the item's key at the time at which the access is required.

The simple addressing system described above may be fast in operation but suffers from the fact that the key values are not usually uniformly distributed across the range of possible key values. For example, if a subject's personal name is used as the key, it will be clear that certain strings of characters such as "SMITH" will appear many times as a key, while other strings such as "ABCDEFG" are extremely unlikely to appear. In the direct key to address conversion system described above, this will lead to bunching of the data items around certain storage addresses, while other addresses will remain unused. This can lead to very inefficient use of the available storage space. To overcome this problem, a technique known as "hashing" is commonly used to calculate a storage address from an item's key.

In the hashing technique a data item's key is converted into a near-random number, which is then scaled as above to provide the storage address for that item. Typically the storage address refers to an area (known as a "bucket") in which a group of items can be stored. The procedure for storing an individual data item is therefore as follows:

a) The item's key is hashed to produce a bucket identifier n, where n is a near-random integer in the range from 1 to N, the total number of buckets available.

b) The physical storage address of bucket n is obtained (for example, by reference to a look-up table of bucket addresses).

c) If bucket n is not already completely filled with data items, the item is stored in this bucket.

d) If however bucket n is full, the item is stored in the first available space in an overflow area. A pointer could be associated with bucket n to identify the overflow address in which the item is stored.

Similarly, when access to the item is subsequently required, the following steps are performed:

a) The item's key is again hashed to produce the same bucket identifier n.

b) The physical storage address for bucket n is again obtained.

c) The item is searched for in bucket n.

d) If the item is not found in bucket n, the overflow area is searched. This additional searching may considerably slow down the retrieval of the data item.

Several hashing techniques are well known in the data processing art. It is generally necessary first to express the file key as a series of digits. In the case of a key containing alphabetical characters, these digits might for example be the ASCII codes for the characters. Once the key has been expressed numerically, a number of algorithms may be used to obtain the near-random number (n) from the digits corresponding to the key. In the "mid square method" the numerical value corresponding to the key is squared; the central digits of the result are then scaled to become the number n. In another method, the polynomial division method, each digit in the key is treated as a polynomial coefficient (for example, the key 7562 would become $7 \times 3 + 5 \times 2 + 6 \times 1 + 2 \times 0$). This polynomial is then divided by another, fixed, polynomial, and the remainder from this division is scaled to become the number n. These and several other hashing techniques are described in the book "Computer Data-Base Organization" (James Martin, Prentice Hall 1975).

EP 0268373 describes a hashing method and apparatus in which a database address is obtained by first replacing each character in the key with a number obtained from an unchanging table of random numbers. The locations used in this table of random numbers are calculated directly from each character in the key. The selected numbers are then combined by interactive bit reordering and exclusive-OR operations to form the near-random number n.

A further prior art hashing technique is described in the article "Fast Uniform String Hashing Algorithm" (IBM Technical Disclosure Bulletin No. 10, 1989, p118).

It will be clear from the above description that there are two principal requirements of a good hashing algorithm:

a) The algorithm must be fast. In other words, only a small amount of processing must be required to obtain the bucket address from a particular key; and b) The algorithm must provide a near-random distribution of bucket addresses from the file keys, even if the keys are systematically related to one another. This feature is necessary to avoid the time-wasting use of overflow areas.

SUMMARY OF THE INVENTION

According to the present invention there is provided a method for calculating a hash value from a key comprising a plurality of digits, comprising the steps of logically combining each digit in the key with a corresponding digit from a first predefined table of digits, according to a first logical combination; replacing each of the logically combined digits with a substitute digit obtained from a second predefined table of digits, the location of the substitute digit in the second table being determined from the value of the digit to be replaced; and combining the substituted digits using a second logical combination.

The invention provides a fast hashing algorithm with a good near-random distribution of hash values, even from systematically related keys. The invention operates on a key comprising a plurality of digits; it will of course be clear to those skilled in the art that a key comprising alphabetical or other textual characters can easily be converted into a plurality of digits using one of a number of methods. For example, the ASCII code corresponding to each character could be used as the corresponding key digit.

As mentioned above, the present invention is applicable to many areas of data processing. For example the invention may be used in connection with the calculation of storage addresses in a database system. Alternatively the invention could be applied to the generation of a hashed authenticator used to link together parts of an electronic message. A further example is that the invention could be used in the generation of digital signatures dependent on a long series of test results from a digital circuit under test.

It is preferred that the first and second logical combinations are such that an inversion of a single bit in either combination's operand causes the inversion of one bit in that combination's output.

It is further preferred that the second logical combination comprises the steps of:

(i) dividing the set of substituted digits into three or more groups of digits;

(ii) logically combining two of the groups according to a third logical combination, to produce a result word;

(iii) overwriting the result word with the logical combination of the result word and a further group, according to the third logical combination; and (iv) repeating step (iii) until the third logical combination has been applied to each of the groups.

It will be clear that the division of the set of substituted digits may take place in a physical sense, in which case the groups of digits will be stored separately, or in an administrative sense, in which case no physical movement of the digits is required. In the latter case, indexing techniques can be used to access the different groups.

Many different operations could be used for the third logical combination, such as sum or difference operations. However a preferred suitable operation, which can be implemented simply, is the exclusive-OR operation.

Similarly, the exclusive-OR operation is preferred for use as the first logical combination. The use of this operation has the advantage that no information is lost from the key digits as a result of the combination with the first table.

In a preferred embodiment the key is first copied to a work area to be processed. The result generated by each of the steps in the hash value calculation may then overwrite the digits used as input to that step.

For simplicity it is preferred that the location of the substitute digit is simply the numerical value of the digit to be replaced. Clearly this requires that the second predefined table contains an entry at each location corresponding to a possible value of the digits to be replaced.

In a preferred embodiment the following steps are carried out after completion of the second logical combination:

(a) multiplying the result of the second logical combination by a predetermined constant;

(b) dividing the result of step (a) into two groups of digits; and (c) combining the two groups of digits using an exclusive-OR operation.

Once again, the division referred to in step (b) may take place in a physical sense or in an administrative or virtual sense.

Finally, in order to conserve storage space it is preferred that a single predefined table is used as the first and the second tables.

The present invention also provides data processing apparatus comprising means for performing the method as described above.

BRIEF DESCRIPTION OF THE DRAWINGS

In order that the invention may be fully understood a preferred embodiment thereof will now be described, by way of example only, with reference to the accompanying drawings in which.

DESCRIPTION OF THE PREFERRED EMBODIMENT

Figure 1:
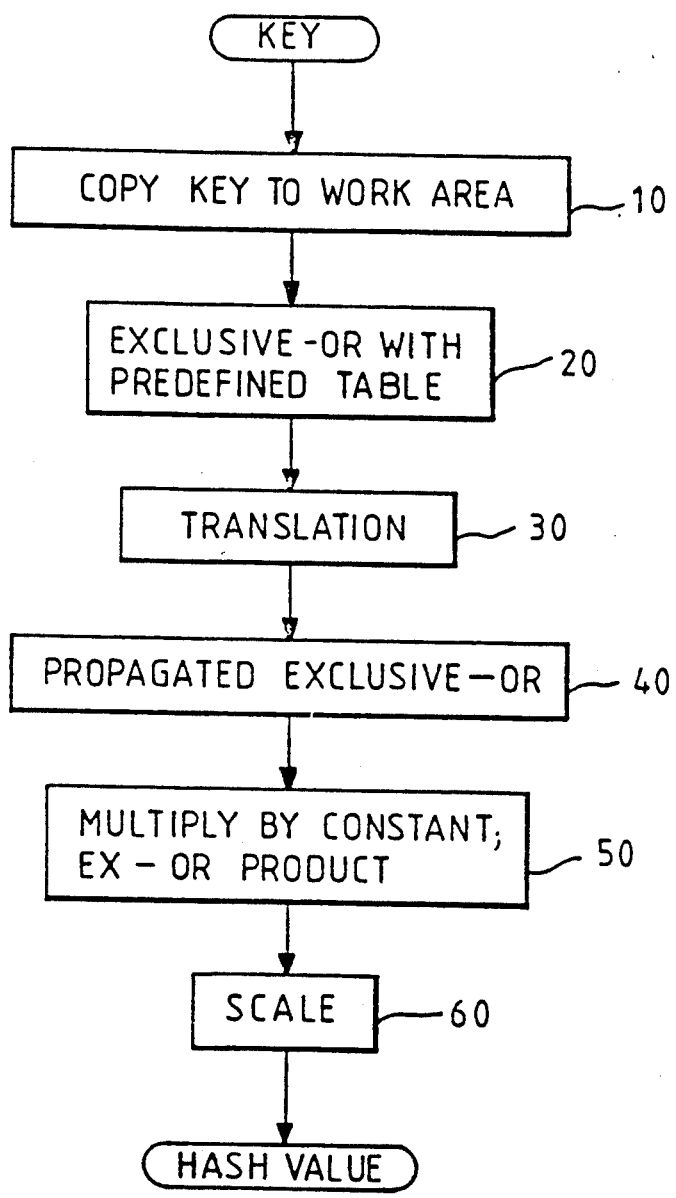
FIG. 1 is a block diagram of the preferred embodiment of the hashing method according to the invention.

Refer now to FIG. 1 which shows a flow diagram representing a preferred embodiment of the hashing method according to the present invention. Each of the stages shown in FIG. 1 will be described more fully below. It will be appreciated that certain of the stages in FIG. 1 are not essential in the broadest aspect of the invention; instead, they should be considered as preferred refinements of the invention.

In step 10 of FIG. 1, the key is copied to a scratchpad (a working area of memory reserved for temporary use during calculations). Typically the key will comprise a number of digits or bytes, each composed of perhaps eight, sixteen or thirty-two bits. In the present example a key comprising 20 eight-bit bytes is considered.

In step 20 the key in the work area is then exclusive-ORed, byte by byte, with corresponding bytes in a predefined table. The result of each of these exclusive-OR operations replaces the original value for that key byte in the work area. Preferably all of the byte values in this table are different. This step helps to ensure that like byte values in different positions in the key will make different contributions to the final result, so that keys which contain the same bytes in a different sequence will map on to separate values. This step is further described with reference to FIG. 2.

Each key byte in the work area, as already modified above, is then replaced in step 30 by a byte selected from a second table of pseudorandom bytes. The location in the table, from which the replacement byte is selected, is directly obtained from the byte to be replaced. This step ensures that key values which originally differed by regular intervals in a particular byte position will differ by unrelated amounts in the final result. Step 30 is described more fully in connection with FIG. 3 below.

A propagated exclusive-OR operation is then performed on the modified key bytes, in step 40. The effect of this is to reduce the 20-byte key down to a four byte number, which is dependent in some way on each of the bytes in the modified key. Further details are given below in connection with the accompanying FIG. 4.

The operations carried out during steps 20 and 40 are particular examples of a class of operations with which a one-bit change in the operation's operand causes a one-bit change in the operation's result.

Finally, the four byte value produced in step 40 is mathematically manipulated and scaled to produce a hashed result in the appropriate range in steps 50 and 60.

Figure 2:
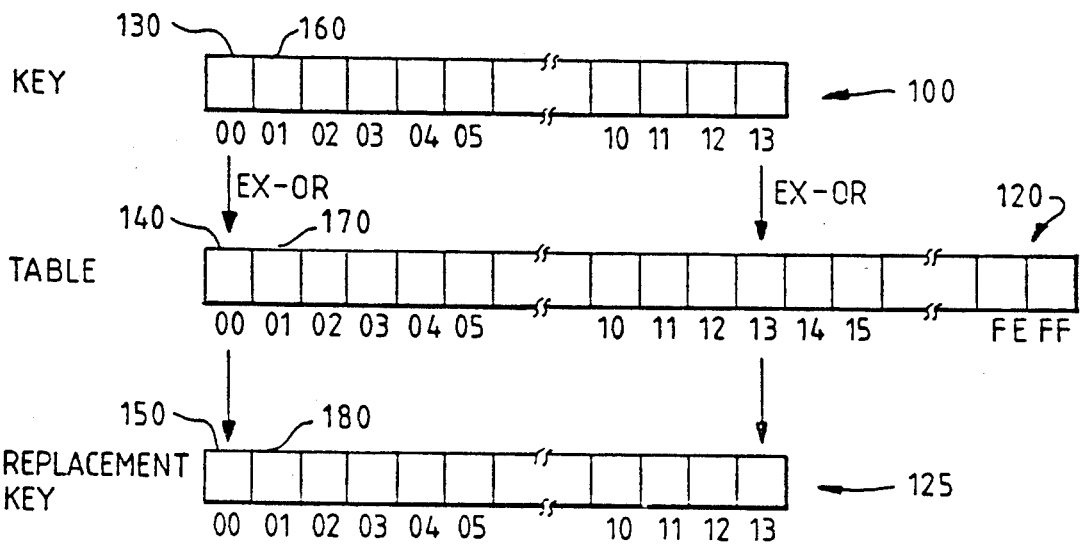
FIGS. 2 to 6 show operation steps of FIG. 1 in schematic form.

FIG. 2 shows the process by which each byte in the key 100 is combined with a corresponding byte in a predefined table. This operation is available as a single command on IBM System/370 data processors, but could easily be achieved using a number of instructions on other data processing machines. This single command is described in the manual "IBM Enterprise Systems Architecture/370 Principles of Operation" (August 1988).

The predefined table need only be as long as the key 100. However, in the present embodiment, a table 256 bytes long is used 120. This is simply to allow the same hashing system to operate on keys of any length up to 256 bytes, and also because if the table 120 has 256 entries it can be reused in a later step in the hashing method. Each byte of the key is shown indexed from 00 to 13 in hexadecimal notation, corresponding to a range of 0 to 19 in decimal notation. Similarly, each byte of the table is shown indexed from 00 to FF in hexadecimal notation, which corresponds to a range of 0 to 255 in decimal notation. The procedure followed is that the first byte in the key, byte 00 (130) is exclusive-ORed with the first byte 140 in table 120. The result is stored as a replacement key byte 150 forming part of the replacement key 125, overwriting the original byte 130 in the work area. The procedure is then repeated for the second key byte 160 which is exclusive-ORed with the second table entry 170 to produce a replacement byte 180 which overwrites byte 160. Each byte of the key is dealt with in turn in this way. As mentioned above, the effect of the process of FIG. 2 is to transform a key having a repetitive sequence of bytes into a more random sequence. To achieve this it is preferred that the table 120 comprises 256 different byte values, arranged in a jumbled or pseudorandom order.

Figure 3:
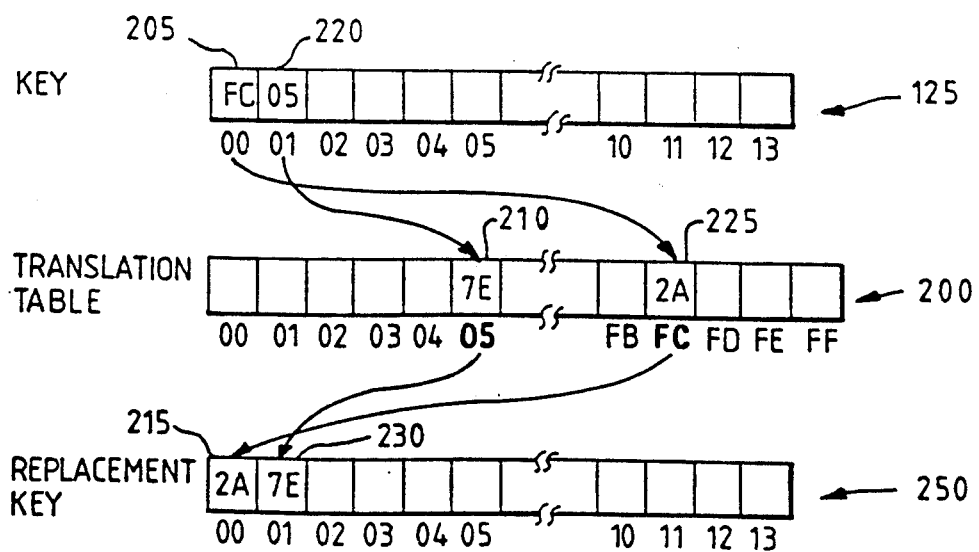

In FIG. 3 the translation step 30 is described in greater detail. This step may also be performed using a single "Translate" command on an IBM System/370 data processor. The replacement key 125 produced during step 20 is used as input to the process, and is combined with translation table 200 as described below. Step 30 produces a further modified key 250 having the same number of bytes (20) as the original key 100 and the key 125 resulting from step 20.

Again in FIG. 3 the bytes in each of the keys 125 and 250, are indexed from 00 to 13 (hex) and those in the translation table 200 from 00 to FF (hex). During the translation step the value of each byte in the source or input key 125 is used as an index into the translation table 200. The byte value found at this indexed position in the table is used as a replacement for that byte in the key.

Two specific examples are shown in FIG. 3. The first byte 205 in the input key 125 contains the hexadecimal value FC. Accordingly, the value of the byte 210 indexed FC in the translation table 200 is used as a replacement for the first key byte. In the diagram this value, 7E is stored as the first byte 215 in the output key 250. In practice the replacement byte would simply overwrite the original first byte 205. Similarly, the value of the second byte 220 is 05 in hexadecimal notation. As above, the value (7E) of byte 225, corresponding to index 05 in table 200, is stored as the replacement second byte 230. It is preferable that all of the 256 byte values in table 200 should be different and arranged in a pseudorandom order. In fact, the same table can be used as table 120 and table 200, to save storage space.

The propagated exclusive-OR operation will now be described with reference to FIG. 4. Again, this operation is available as a single command on IBM System/370 data processors, but could easily be achieved using a number of instructions on other data processing machines.

The basic principles of the propagated exclusive-OR are firstly that the key is combined with a byte-shifted version of itself, and secondly that this combination can be carried out in a rolling manner, progressing through the key in small increments. The overall result is to produce a 4 byte number which is dependent on each of the 20 individual key bytes.

Figure 4:
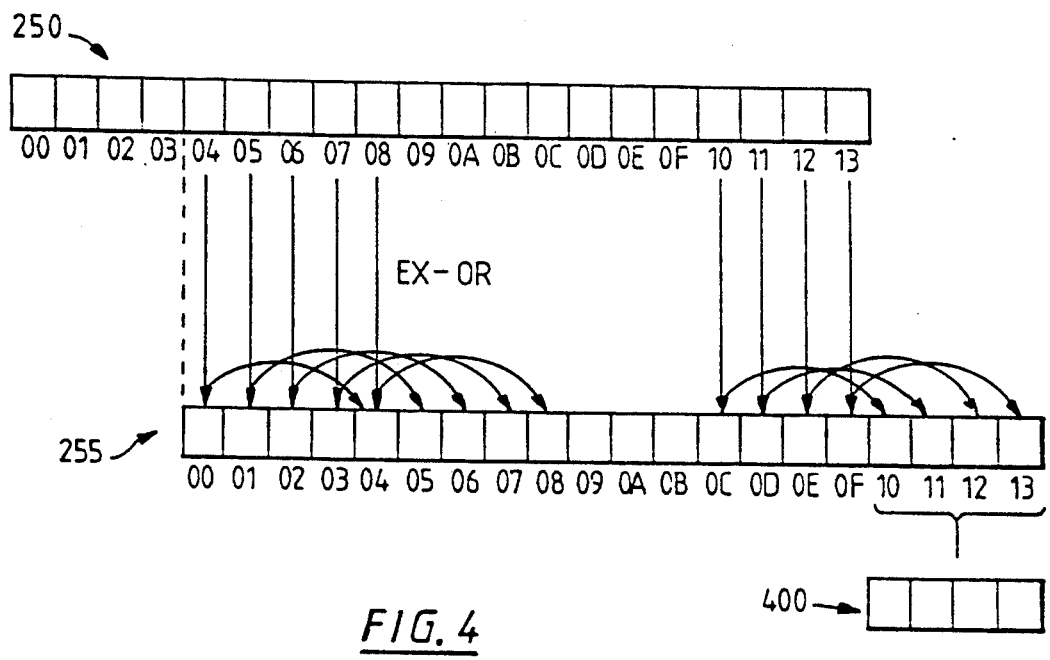

The function is shown schematically in FIG. 4, in which the resultant key 250 from the previous step (as shown in FIG. 3) is used as the input to the process. Key 250 is combined with key 255, which is identical to key 250 except for a 4-byte shift to the right. In practice a separate copy 255 of the key 250 would not be made; indexing methods would be used to access the different bytes in the key 250 as appropriate during the operation. However, for clarity of explanation, FIG. 4 shows the copied key 255.

Referring to FIG. 4, the propagated exclusive-OR operation proceeds as follows. The first four bytes in key 255 are exclusive-ORed with bytes 04 to 07 respectively in key 250, the results being written into bytes 04 to 07 respectively in key 255. The new bytes 04 to 07 in key 255 are then exclusive-ORed with bytes 08 to 0B respectively in key 250, the results now being written into bytes 08 to 0B in key 255. This process continues through keys 250 and 255 until the final step of exclusive-ORing bytes 10 to 13 in key 250 with bytes 0C to 0F respectively in key 255, the final results now being written into bytes 10 to 13 respectively in key 255. These four bytes are thus dependent upon the remainder of the input key 250, and are passed on to the next step 50 in the hashing process as the four-byte word 400.

The steps 20, 30 and 40 can be performed using three instructions on particular types of data processors (such as the IBM System/370). This makes the hashing method especially fast in this case; however, the method is equally applicable to other types of data processor. If a data processor capable of parallel processing is used, each of the steps 20 and 30 could be performed on all of the key bytes simultaneously, since in these steps the result produced from each key byte is independent of the other key bytes.

Although the propagated exclusive-OR process produces a four-byte result 400 which is dependent on each of the bytes in the modified key 250, each individual byte in the four byte word 400 is only in fact dependent on every fourth byte in the key 250. Because it is more desirable in a hashing method that the dependency on a particular key byte is spread throughout the final result, a further step 50 is introduced. Step 50 is described in more detail below, in connection with FIG. 5.

Figure 5:
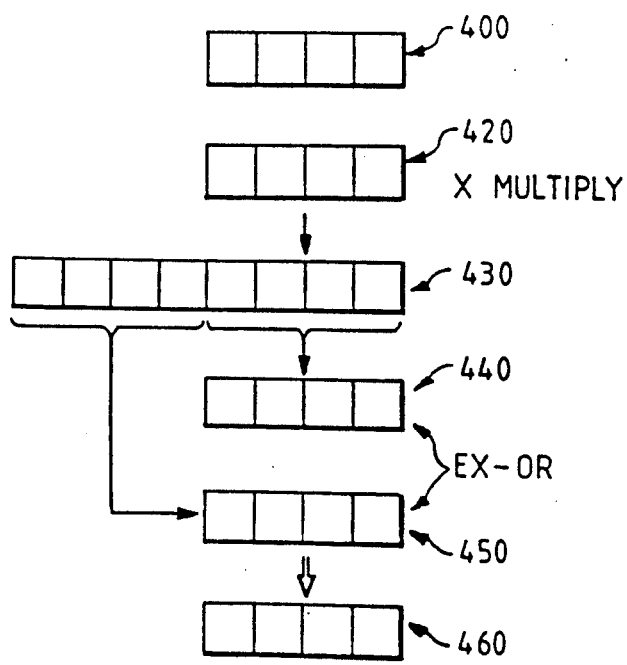

The step described in FIG. 5 takes the four byte word 400 as its input. This word is then multiplied by an arbitrary constant 420 to produce an eight-byte word 430. Word 430 is then split into two four-byte portions 440 and 450, which are exclusive-ORed with each other to produce the four-byte result 460. If desired, this process of multiplication by a constant, splitting and exclusive-ORing may be repeated on the result 460.

This value 460 is now considered to be a near-random hash value produced from the original key 100. However, the range of possible values of the hash value may have to be adjusted in step 60, to suit the particular application in use.

Figure 6:
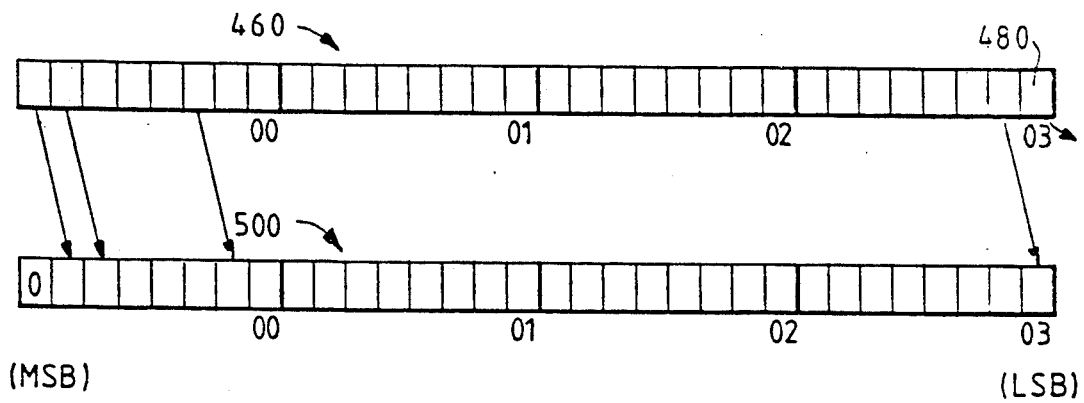

The final step 60 in FIG. 1 is used to transform the 4-byte hash value 460 into a suitable range for the method's application. For example, if the hashing method were used to produce bucket addresses for storage of a data item, the final hashed result would need to be in the range from 1 to the total number of buckets. The scaling is performed by the straightforward mathematical operation of multiplying or dividing by a constant. A particular example of such an operation is shown in FIG. 6.

It should be noted that the 4-byte value 460 produced during the above procedure has a possible range of 00000000 to FFFFFFFF in hexadecimal notation. In the particular example in FIG. 6 it is desired to reduce this to a range of 00000000 to 7FFFFFFF. This can easily be achieved by performing a shift of one bit to the right. A zero is inserted as the most significant bit in the four byte word, and then each bit in the input word 460 is shifted by one bit position in a direction towards the least significant bit. The least significant bit 480 in the input word is discarded. In practice the shifting process would overwrite the input word 460; for clarity, however, the result of the bit-shift is shown as a separate word 500.

The shifted 4-byte word 500 may now be considered as the final result of the hashing process.

The invention may be put into operation using dedicated data processing apparatus, using a general purpose data processor under program control, or using hard-wired or customized logical circuitry. The operation of the invention using a general purpose data processor will now be described further with reference to FIG. 7.

Figure 7:
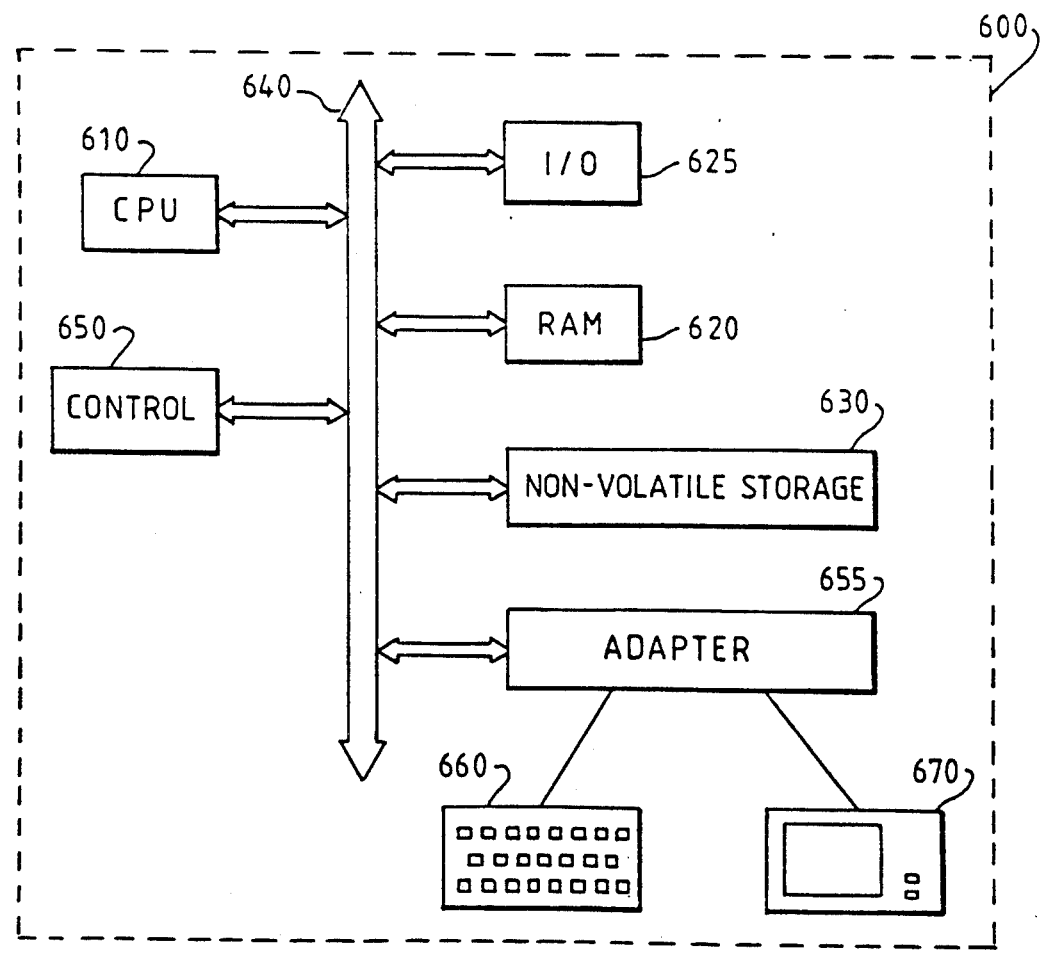
FIG. 7 shows data processing apparatus according to the invention.

FIG. 7 shows, by way of example, data processing apparatus 600 with which the present invention may be practiced. The apparatus 600 comprises a central processing unit (CPU) 610, random access memory (RAM) 620, input/output (I/0) port 625, and nonvolatile storage 630 such as disc storage or read only memory (ROM), all connected to a common bus structure 640. Control circuitry 650 performs housekeeping operations such as providing appropriate clock signals and controlling the operation of the bus 640. An adapter 655 may be used to interface to other components such as a keyboard 660 and a visual display unit (VDU) 670.

The general purpose data processor shown in FIG. 7 is used to perform the invention under program control. In broad terms such a program would carry out steps 10 to 60 in FIG. 1, which are described in greater detail in FIGS. 2 to 6. The key is preferably copied to a work area which may be for example a processor register, a permanently dedicated scratchpad area in the RAM, or a dynamically acquired area of RAM or virtual storage. The first and second predefined tables (or preferably a single table used for both purposes) can be stored in RAM or nonvolatile memory. Most commonly used processors include suitable exclusive-OR, byte multiplication, and indexing operations. It is well within the abilities of a skilled programmer to write program code (for example in assembly language) to carry out the operations described above.

In operation, the key to be hashed may be generated within the data processor or may be input directly by an operator using, for example, the keyboard. The hashed value would then be calculated as described above, and would be passed to another part of the program in which data in a storage area addressed by the hash value may be retrieved.

It is also possible to implement the invention as a hard-wired logic circuit. Indeed, this may be desirable in applications where high speed operation is required, or where hashing is the only function performed by the data processor.

While the invention has been described with reference to a preferred embodiment it will be clear that various changes could be made without departing from the broadest aspect of the invention. In particular, certain of the operations described above are desirable but not essential for the operation of the invention. Also, although particular logical operations (such as the exclusive-OR operation) have been specified in the above description of the preferred embodiment, these may be replaced by other logical operations or combinations of operations as appropriate.

I claim:

1. In a data processing system having a central processing unit (CPU) and memory, a computerized method for locating a data item using a key stored in the memory comprising a plurality of digits by calculating a hash value from the key (100), comprising the steps of:
   logically combining (20) in the memory, by means of the CPU, each digit (130,160) in the key with a corresponding digit (140,170) from a first predefined table (120) of digits stored in the memory, according to a first logical combination;
   overwriting (30) each of the logically combined digits (205,220) in the memory with a substitute digit (215,230) obtained from a second predefined table (200) of digits stored in the memory, the location of the substitute digit in the second table being determined by the CPU from the value of the digit to be replaced combining in the memory, by means of the CPU, the substituted digits using a second logical combination (40); and using the results of the second logical combination to locate the data item.

2. A method as claimed in claim 1, in which: the first and second logical combinations are such that an inversion of a single bit in either combination's operand causes the invention of one bit in that combination's output.

3. A method as claimed in claim 1, in which the second logical combination (40) comprises the steps of:
 (i) dividing the set of substituted digits in the memory, by means of the CPU, into three or more groups of digits;
 (ii) logically combining two of the groups in the memory, by means of the CPU, according to a third logical combination, to produce a result word;
 (iii) overwriting the result word in the memory, by means of the CPU, with the logical combination of the result word and a further group, according to the third logical combination; and
 (iv) repeating step (iii) until the third logical combinations has been applied to each of the groups.

4. A method as claimed in claim 3 in which the third logical combination is the exclusive-OR operation.

5. A method as claimed in claim 1, in which each key digit (130,160) is combined with the corresponding digit (140,170) in the first predefined table (120) using an exclusive-OR operation.

6. A method as claimed in claim 1, further comprising the step of copying the key to a working area of memory before the first logical combining step.

7. A method as claimed in claim 1, in which:
 the location of the substitute digit (215,230) in the second table (200) is the numerical value of the digit (205,220) to be replaced; and
 the second predefined table (200) contains an entry at each location corresponding to a possible value of the digits to be replaced.

8. A method as claimed in claim 1, further comprising the following steps (50), carried out following the second logical combination:
 (a) multiplying the result of the second logical combination by a predetermined constant;
 (b) dividing the result of step (a) into two groups of digits; and
 (c) combining the two groups of digits using an exclusive-OR operation.

9. A method as claimed in claim 1, in which a single predefined table is used as the first (120) and the second (200) tables.

10. Data processing apparatus (600) comprising means for performing the method as claimed in claim 1.

11. In a data processing system having a central processing unit (CPU), memory and a database, a computerized method for retrieving a data item stored in the database using a key stored in the memory, by calculating a hash value from the key comprising a plurality of digits, comprising the steps of:
 (a) logically combining in the memory, by means of the CPU, each of said digits in said key with a corresponding digit from a first predefined table of digits stored int he memory using a first logical combination to produce a plurality of logically combined digits;
 (b) overwriting in memory, by means of the CPU, each of said logically combined digits with a substitute digit obtained from a second predefined table of digits stored in the memory to produce a set of substituted digits, the location of the substitute digit in said second table being determined from the value of the digit to be replaced;
 (c) dividing said set of substituted digits in memory, by means of the CPU, into at least three groups of digits;
 (d) logically combining two of said groups in memory, by means of the CPU, according to a second logical combination to produce a result word;
 (e) overwriting in memory, by means of the CPU, said result word with the logical combination of said result word and a further group stored in the memory, according to a second logical combination;
 (f) repeating step (e) until said second logical combination has been applied to each of said groups; and
 (g) retrieving the data item from the database using the result of step (f) to determine the location of the data item in the database.

12. A method as claimed in claim 11, further comprising the step of copying the key to a working area of memory before the first logical combination.

13. A method as claimed in claim 12, further comprising the following steps of:
 (a) multiplying in memory, by means of the CPU, said result word by a predetermined constant;
 (b) dividing the result of in memory, by means of the CPU, step (a) into two groups of digits; and
 (c) combining in memory, by means of the CPU, the two groups of digits using an exclusive-OR operation.

14. A method as claimed in claim 13 in which a single predetermined table is used as said first and second tables.

15. A method as claimed in claim 14, in which said first and second logical combinations are exclusive-OR operations.

16. A data processing apparatus for locating a data item by calculating a hash value from a key comprising a plurality of digits, said data processing apparatus comprising:
 means for storing the key in a working area of memory in the data processing apparatus;
 means for logically combining each of said key digits stored in the working area with a corresponding digit from a first predetermined table of digits stored in the data processing apparatus memory according to a first logical combination;
 means for overwriting in the working area each of the logically combined digits with a substitute digit obtained from a second predefined table of digits stored in the data processing apparatus memory, the location of the substitute digit in the second table being determined from the value of the digit to be replaced;
 means for combining the substitute digits in the working area using a second logical combination and;
 means for locating the data item using the results of the second logical combination.

17. The data processing apparatus of claim 16, wherein each key digit is combined with said corresponding digit in the first predetermined table using an exclusive-OR operation.

18. The data processing apparatus of claim 16, further comprising means for copying said key to a register.

19. The data processing apparatus of claim 16, wherein said means for combining the substituted digits using a second logical combination comprises:

means for dividing the set of substitute digits into three or more groups of digits;

means for logically combining two of the groups in the working area according to a third logical combination to produce a resulting word; and means for repeatedly overwriting the result word in the working area with the logical combination of the result word in a further group, according to the third logical combination.

20. The data processing apparatus of claim 19, further comprising:

means for multiplying said result word by a predetermined constant;

means for dividing said result word into two groups of digits; and means for combining the two groups of digits using an exclusive-OR operation.

* * * * *